No. 771,204. PATENTED SEPT. 27, 1904.
G. P. GRIFFIN.
STRAW FEEDING MACHINE.
APPLICATION FILED NOV. 11, 1903.
NO MODEL.
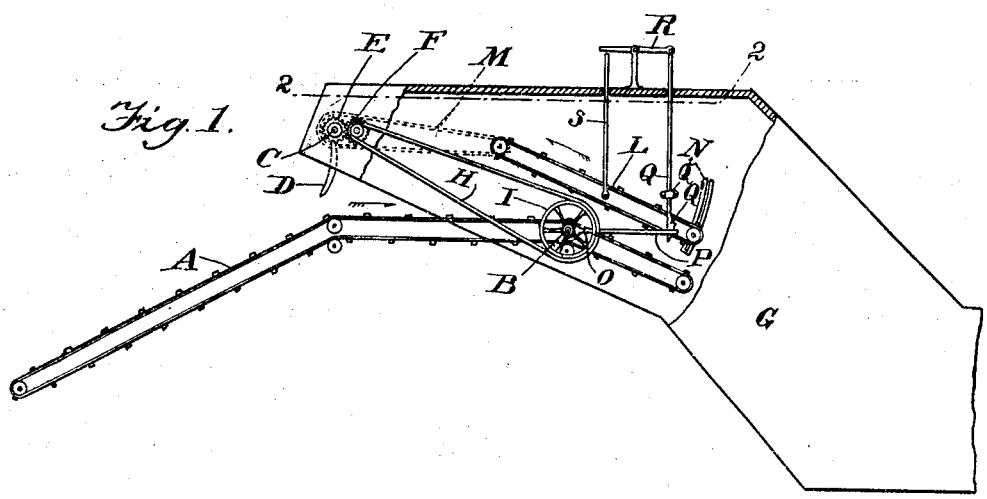
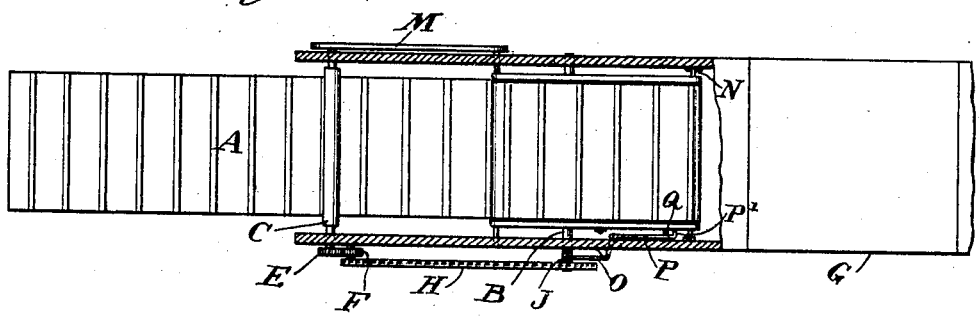
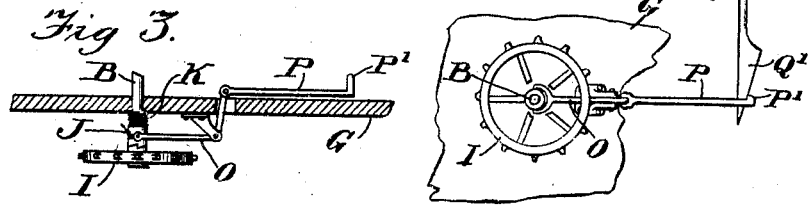
Witnesses:
H. B. Hallck.
L. A. Morrison.
Inventor:
George P. Griffin,
By [signature], Atty.

No. 771,204.

Patented September 27, 1904.

UNITED STATES PATENT OFFICE.

GEORGE P. GRIFFIN, OF MENLO, IOWA, ASSIGNOR OF ONE-HALF TO W. L. THEURER AND THOMAS WALTERS, OF MENLO, IOWA.

STRAW-FEEDING MACHINE.

SPECIFICATION forming part of Letters Patent No. 771,204, dated September 27, 1904.

Application filed November 11, 1903. Serial No. 180,650. (No model.)

*To all whom it may concern:*

Be it known that I, GEORGE P. GRIFFIN, a citizen of the United States, residing at Menlo, county of Guthrie, and State of Iowa, have invented a certain new and useful Improvement in Straw-Feeding Machines, of which the following is a specification.

My invention relates to a new and useful improvement in self-feeders for threshing-machines, and has for its object to provide a feeder which will spread the bundle of straw into a thin layer after the band has been cut, and if too much straw is fed to the machine said feeder will automatically check the feed until the straw has again reached its proper level, thus automatically regulating the speed of the straw to the machine.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a side elevation of my improved feeder, a portion of the casing being broken away to show the operating parts; Fig. 2, a section on the line 2 2 of Fig. 1; Fig. 3, a detail plan view of the clutch mechanism; Fig. 4, a side elevation of Fig. 3.

A represents the bottom conveyer, upon which the bundle of straw is first placed to be carried to the band-cutting knives. This conveyer is in the usual form of an endless belt passing over suitable guide-rollers and is driven from the shaft B.

C is a shaft upon which the band-cutting knives D are secured, said shaft forming the power-shaft. Upon one end of this shaft C is secured a pinion E, which meshes with a pinion F, journaled upon a stud extending outward from the casing G.

I is a pulley journaled loosely upon the shaft B, and power is communicated to said pulley from the pinion F.

J is one member of a clutch, keyed upon the shaft B, so as to slide thereon, the other member of the clutch being secured to the pulley I. A spring K tends to always force the member J into engagement with the other member.

L is a short conveyer arranged behind the band-cutting knives and above the rearward portion of the conveyer A. This conveyer L runs over suitable guide-pulleys and is driven at a much greater speed than the conveyer A by means of a belt or chain M, which passes around a small pulley secured to one of the idle rollers of the conveyer L and then around a larger pulley secured upon the shaft C. Thus as the bundle is fed toward the machine the band-cutting knives D will sever the band, and the unbound bundle will then travel toward the conveyer L, and as said conveyer L travels at a greater speed than the conveyer A the bundle will be spread out in a comparatively thin layer, so as to be fed properly to the cylinder of the machine. The conveyer L is pivoted at its forward or driven end, and the rearward end of the conveyer is free to swing upon its pivot, the shaft of the idle roller at its free end being guided in slots N, formed through the casing. Thus the conveyer L simply floats upon the top of the straw.

O is a bell-crank lever pivoted to the casing G, one end of said lever being in engagement with an annular groove formed in the clutch member J upon the shaft B, the other end of the bell-crank lever being connected to a bar P, the outer end of which is bent at right angles, as shown at P'.

Q is a rod extending upward vertically and adapted to slide in suitable bearings $Q^2$. The lower end of this rod Q is wedge shape, as shown at Q', and this wedge-shape end lies behind the inturned end P' of the bar P. The upper end of the rod Q is pivoted to one end of a lever R, which lever is pivoted intermediate of its two ends to the casing G.

S is a rod secured to the conveyer L and extending upward, the upper end lying below the other end of the lever R. Thus when more straw is fed to the feeder than can be taken by the cylinder of the machine the surplus straw will cause the conveyer L to raise, and the rod S by pushing upward upon the lever R will force the wedge-shape end Q' downward, and this, through the bell-crank lever O, will force the clutch member J out of engagement with the wheel I, and therefore stop the movement of the lower conveyer A, and the upper conveyer will then continue to feed the straw until the straw has been reduced to the proper level, and then the conveyer will fall to its normal position, and this will allow the spring K to act to throw the member J into clutch with the wheel I, and thus cause the conveyer A to resume its movement.

Of course I do not wish to be limited to the exact construction here shown, as slight modifications could be made without departing from the spirit of my invention.

Having thus fully described my invention, what I claim as new and useful is—

In a machine of the character described, a lower conveyer made in the form of an endless belt, suitable guide-pulleys over which said belt runs, a shaft for driving the lower conveyer, a pulley journaled loosely upon said shaft, a power-shaft band-cutting knife secured to said power-shaft, means for driving the pulley from the power-shaft, a clutch for throwing the pulley in and out of engagement with the shaft of the lower conveyer, an upper conveyer arranged at the rear of the lower conveyer and a distance above the same, the upper conveyer being pivoted at the forward end, the rearward end of said conveyer being free to move up and down concentric with the pivotal point, means for driving said upper conveyer from the power-shaft at a speed greater than the lower conveyer, a bell-crank lever extending from the clutch, a rod extending upward, the lower end of said rod being formed wedge shape and in engagement with the bell-crank lever, means for forcing said rod downward when the upper conveyer is forced upward by the straw so as to throw the clutch out of engagement with the pulley and stop the movement of the lower conveyer, and a spring for returning the clutch into engagement, as specified.

In testimony whereof I have hereunto affixed my signature in the presence of two subscribing witnesses.

GEORGE P. GRIFFIN.

Witnesses:
F. L. COTTRELL,
E. G. RIGDON.